(12) United States Patent
Assadollahi

(10) Patent No.: US 8,374,846 B2
(45) Date of Patent: Feb. 12, 2013

(54) TEXT INPUT DEVICE AND METHOD

(75) Inventor: Ramin O Assadollahi, Constance (DE)

(73) Assignee: Neuer Wall Treuhand GmbH

( * ) Notice: Subject to any disclaimer, the term of this patent is extended or adjusted under 35 U.S.C. 154(b) by 860 days.

(21) Appl. No.: 12/181,273

(22) Filed: Jul. 28, 2008

(65) Prior Publication Data

US 2009/0192786 A1   Jul. 30, 2009

Related U.S. Application Data

(63) Continuation-in-part of application No. 11/131,867, filed on May 18, 2005, and a continuation-in-part of application No. 11/560,668, filed on Nov. 16, 2006, and a continuation-in-part of application No. 11/940,400, filed on Nov. 15, 2007.

(30) Foreign Application Priority Data

Aug. 2, 2007   (EP) .................................... 07113700

(51) Int. Cl.
*G06F 17/27* (2006.01)
*G06F 17/21* (2006.01)
*G06F 17/28* (2006.01)
*G06F 17/00* (2006.01)
*G06F 3/048* (2006.01)

(52) U.S. Cl. ....... 704/9; 704/4; 704/6; 704/10; 715/262; 715/264; 715/203; 715/811

(58) Field of Classification Search ................. 704/9, 10, 704/4, 6; 715/259, 261, 262, 264, 203, 811
See application file for complete search history.

(56) References Cited

U.S. PATENT DOCUMENTS

| | | | |
|---|---|---|---|
| 5,109,352 A | 4/1992 | O'Dell | |
| 5,623,406 A | 4/1997 | Ichbiah | |
| 5,805,911 A * | 9/1998 | Miller | 715/234 |
| 5,818,437 A * | 10/1998 | Grover et al. | 715/811 |
| 5,945,928 A * | 8/1999 | Kushler et al. | 341/28 |
| 5,952,942 A * | 9/1999 | Balakrishnan et al. | 341/20 |
| 5,953,541 A | 9/1999 | King et al. | |
| 5,963,671 A | 10/1999 | Comerford et al. | |
| 6,005,495 A | 12/1999 | Connolly et al. | |

(Continued)

FOREIGN PATENT DOCUMENTS

| | | |
|---|---|---|
| CA | 2601859 | 6/2000 |
| CA | 2547143 | 11/2006 |

(Continued)

OTHER PUBLICATIONS

Jennifer Mankoff and Gregory D. Abowd, Cirrin: A Word-Level Unistroke Keyboard for Pen Input, Proceedings of UIST 1998, Technical note. pp. 213-214.*

(Continued)

*Primary Examiner* — Edgar Guerra-Erazo
(74) *Attorney, Agent, or Firm* — Alston & Bird LLP

(57) ABSTRACT

The present invention relates to a text input device and a method for inputting text, and a computer program for performing the method. A text input device (200) is provided that comprises: a text prediction component for predicting candidate words in accordance with a current text context; a display screen (210) for displaying the predicted candidate words; a data entry device (220) having a navigation means (240) for selecting a direction to move a cursor on the display screen (210); and a processor receiving data from the data entry device (220) upon actuation of the navigation means (240). The processor arranges the candidate words on the display screen (210) in a spatial arrangement that reflects the selectable directions of the navigation means (240). The processor maps the currently displayed candidate words to the corresponding directions and selects a candidate word upon selection of a direction.

21 Claims, 5 Drawing Sheets

U.S. PATENT DOCUMENTS

| | | | |
|---|---|---|---|
| 6,005,498 A * | 12/1999 | Yang et al. | 341/23 |
| 6,011,554 A | 1/2000 | King et al. | |
| 6,219,731 B1 | 4/2001 | Gutowitz | |
| 6,223,059 B1 | 4/2001 | Haestrup | |
| 6,286,064 B1 * | 9/2001 | King et al. | 710/67 |
| 6,307,548 B1 | 10/2001 | Flinchem et al. | |
| 6,307,549 B1 | 10/2001 | King et al. | |
| 6,362,752 B1 * | 3/2002 | Guo et al. | 341/28 |
| 6,377,965 B1 * | 4/2002 | Hachamovitch et al. | 715/203 |
| 6,405,060 B1 | 6/2002 | Schroeder et al. | |
| 6,473,006 B1 | 10/2002 | Yu et al. | |
| 6,636,162 B1 | 10/2003 | Kushler et al. | |
| 6,646,573 B1 | 11/2003 | Kushler et al. | |
| 6,712,534 B2 | 3/2004 | Patel | |
| 6,766,179 B1 * | 7/2004 | Shiau et al. | 455/566 |
| 6,955,602 B2 | 10/2005 | Williams | |
| 7,075,520 B2 | 7/2006 | Williams | |
| 7,103,852 B2 | 9/2006 | Kairis, Jr. | |
| 7,111,248 B2 | 9/2006 | Mulvey et al. | |
| 7,286,115 B2 * | 10/2007 | Longe et al. | 345/168 |
| 7,296,021 B2 | 11/2007 | Malkin et al. | |
| 7,319,957 B2 | 1/2008 | Robinson et al. | |
| 7,395,203 B2 | 7/2008 | Wu et al. | |
| 7,443,316 B2 | 10/2008 | Lim | |
| 7,461,059 B2 | 12/2008 | Richardson et al. | |
| 7,475,072 B1 | 1/2009 | Ershov | |
| 7,480,619 B1 | 1/2009 | Scott | |
| 7,487,145 B1 | 2/2009 | Gibbs et al. | |
| 7,580,829 B2 | 8/2009 | James et al. | |
| 7,580,925 B2 | 8/2009 | Unruh et al. | |
| 7,587,378 B2 | 9/2009 | Van Meurs | |
| 7,610,194 B2 | 10/2009 | Bradford et al. | |
| 7,617,200 B2 | 11/2009 | Budzik et al. | |
| 7,679,534 B2 | 3/2010 | Kay et al. | |
| 7,712,053 B2 | 5/2010 | Bradford et al. | |
| 7,720,682 B2 | 5/2010 | Stephanick et al. | |
| 7,725,485 B1 | 5/2010 | Sahami et al. | |
| 7,750,891 B2 * | 7/2010 | Stephanick et al. | 345/173 |
| 7,840,579 B2 | 11/2010 | Samuelson et al. | |
| 7,840,770 B2 | 11/2010 | Larson | |
| 8,036,878 B2 * | 10/2011 | Assadollahi | 704/10 |
| 8,117,540 B2 * | 2/2012 | Assadollahi | 715/256 |
| 2002/0021311 A1 | 2/2002 | Shechter et al. | |
| 2002/0075323 A1 | 6/2002 | O'Dell | |
| 2002/0078106 A1 | 6/2002 | Carew et al. | |
| 2002/0126097 A1 | 9/2002 | Savolainen | |
| 2002/0152203 A1 | 10/2002 | Ostergaard et al. | |
| 2002/0163504 A1 | 11/2002 | Pallakoff | |
| 2002/0180689 A1 | 12/2002 | Venolia | |
| 2002/0196163 A1 | 12/2002 | Bradford et al. | |
| 2003/0011574 A1 | 1/2003 | Goodman | |
| 2003/0023420 A1 | 1/2003 | Goodman | |
| 2003/0023426 A1 * | 1/2003 | Pun et al. | 704/9 |
| 2003/0030573 A1 | 2/2003 | Ure | |
| 2003/0054830 A1 | 3/2003 | Williams et al. | |
| 2003/0064686 A1 | 4/2003 | Thomason et al. | |
| 2003/0097252 A1 | 5/2003 | Mackie | |
| 2003/0104839 A1 | 6/2003 | Kraft et al. | |
| 2003/0107555 A1 | 6/2003 | Williams | |
| 2003/0144830 A1 | 7/2003 | Williams | |
| 2004/0017946 A1 | 1/2004 | Longe et al. | |
| 2004/0024584 A1 | 2/2004 | Brill | |
| 2004/0056844 A1 | 3/2004 | Gutowitz et al. | |
| 2004/0070567 A1 * | 4/2004 | Longe et al. | 345/156 |
| 2004/0095327 A1 | 5/2004 | Lo | |
| 2004/0122979 A1 | 6/2004 | Kirkland | |
| 2004/0140956 A1 | 7/2004 | Kushler et al. | |
| 2004/0153963 A1 | 8/2004 | Simpson et al. | |
| 2004/0153975 A1 | 8/2004 | Williams et al. | |
| 2004/0160419 A1 | 8/2004 | Padgitt | |
| 2004/0176114 A1 | 9/2004 | Northcutt | |
| 2005/0017954 A1 | 1/2005 | Kay et al. | |
| 2005/0043949 A1 | 2/2005 | Roth et al. | |
| 2005/0060448 A1 | 3/2005 | Gutowitz | |
| 2005/0114770 A1 | 5/2005 | Sacher et al. | |
| 2005/0188330 A1 | 8/2005 | Griffin | |
| 2005/0192802 A1 | 9/2005 | Robinson et al. | |
| 2005/0240391 A1 | 10/2005 | Lekutai | |
| 2005/0283358 A1 | 12/2005 | Stephanick et al. | |
| 2005/0283364 A1 | 12/2005 | Longe et al. | |
| 2006/0013487 A1 | 1/2006 | Longe et al. | |
| 2006/0018545 A1 | 1/2006 | Zhang et al. | |
| 2006/0025091 A1 | 2/2006 | Buford | |
| 2006/0123354 A1 * | 6/2006 | Volovitz | 715/780 |
| 2006/0136408 A1 | 6/2006 | Weir et al. | |
| 2006/0158436 A1 | 7/2006 | LaPointe et al. | |
| 2006/0167689 A1 | 7/2006 | Maren | |
| 2006/0167872 A1 | 7/2006 | Parikh | |
| 2006/0173807 A1 | 8/2006 | Weir et al. | |
| 2006/0190256 A1 | 8/2006 | Stephanick et al. | |
| 2006/0190447 A1 | 8/2006 | Harmon et al. | |
| 2006/0236239 A1 * | 10/2006 | Simpson et al. | 715/531 |
| 2006/0242576 A1 | 10/2006 | Nagel et al. | |
| 2006/0247915 A1 | 11/2006 | Bradford et al. | |
| 2006/0256139 A1 | 11/2006 | Gikandi | |
| 2006/0259479 A1 | 11/2006 | Dai | |
| 2006/0265208 A1 * | 11/2006 | Assadollahi | 704/9 |
| 2007/0030249 A1 * | 2/2007 | Griffin et al. | 345/169 |
| 2007/0074131 A1 * | 3/2007 | Assadollahi | 715/816 |
| 2007/0075915 A1 | 4/2007 | Cheon et al. | |
| 2007/0076862 A1 * | 4/2007 | Chatterjee et al. | 379/433.06 |
| 2007/0094718 A1 | 4/2007 | Simpson | |
| 2007/0106785 A1 | 5/2007 | Tandon | |
| 2007/0203879 A1 | 8/2007 | Templeton-Steadman et al. | |
| 2007/0205983 A1 * | 9/2007 | Naimo | 345/160 |
| 2007/0216651 A1 | 9/2007 | Patel | |
| 2007/0226649 A1 * | 9/2007 | Agmon | 715/816 |
| 2007/0268264 A1 | 11/2007 | Aarras et al. | |
| 2007/0285397 A1 | 12/2007 | LaPointe et al. | |
| 2008/0034081 A1 | 2/2008 | Marshall et al. | |
| 2008/0072143 A1 * | 3/2008 | Assadollahi | 715/261 |
| 2008/0072145 A1 | 3/2008 | Blanchard et al. | |
| 2008/0076472 A1 | 3/2008 | Hyatt | |
| 2008/0138135 A1 | 6/2008 | Gutowitz | |
| 2008/0154576 A1 | 6/2008 | Wu et al. | |
| 2008/0159841 A1 | 7/2008 | Keller | |
| 2008/0189605 A1 | 8/2008 | Kay et al. | |
| 2008/0195388 A1 | 8/2008 | Bower et al. | |
| 2008/0235003 A1 | 9/2008 | Lai et al. | |
| 2008/0244446 A1 | 10/2008 | LeFevre et al. | |
| 2008/0263015 A1 | 10/2008 | Qiu et al. | |
| 2008/0266263 A1 | 10/2008 | Motaparti et al. | |
| 2008/0288665 A1 | 11/2008 | Williams | |
| 2008/0291059 A1 | 11/2008 | Longe | |
| 2009/0019002 A1 | 1/2009 | Boulis | |
| 2009/0037371 A1 | 2/2009 | Unruh et al. | |
| 2009/0055732 A1 | 2/2009 | Motaparti et al. | |
| 2009/0077037 A1 | 3/2009 | Wu et al. | |
| 2009/0092323 A1 | 4/2009 | Qiu et al. | |
| 2009/0150383 A1 | 6/2009 | Qiu et al. | |
| 2009/0154682 A1 | 6/2009 | Qiu | |
| 2009/0193334 A1 * | 7/2009 | Assadollahi | 715/261 |
| 2009/0306969 A1 | 12/2009 | Goud et al. | |
| 2010/0121876 A1 | 5/2010 | Simpson et al. | |
| 2010/0122164 A1 | 5/2010 | Kay et al. | |
| 2010/0161538 A1 | 6/2010 | Kennedy, Jr. et al. | |
| 2010/0174529 A1 | 7/2010 | Bradford et al. | |
| 2010/0188338 A1 | 7/2010 | Longe | |
| 2010/0228710 A1 | 9/2010 | Imig et al. | |
| 2010/0277416 A1 * | 11/2010 | Longe et al. | 345/171 |
| 2011/0071834 A1 | 3/2011 | Kristensson et al. | |
| 2011/0197128 A1 * | 8/2011 | Assadollahi | 715/259 |
| 2011/0197152 A1 * | 8/2011 | Assadollahi | 715/764 |
| 2012/0005576 A1 | 1/2012 | Assadollahi | |

FOREIGN PATENT DOCUMENTS

| | | |
|---|---|---|
| EP | 0 858 023 A2 * | 10/1998 |
| EP | 0930760 | 7/1999 |
| EP | 1347361 | 9/2003 |
| EP | 1347361 A1 | 9/2003 |
| EP | 1724692 | 11/2006 |
| GB | 2399202 | 9/2004 |
| WO | WO 02/91160 * | 5/2002 |
| WO | 2005036413 | 4/2005 |
| WO | 2006080927 | 8/2006 |

| | | |
|---|---|---|
| WO | 2006080935 | 8/2006 |
| WO | 2008034112 | 3/2008 |
| WO | WO 2008/030563 A2 | 3/2008 |

OTHER PUBLICATIONS

Schneider-Hufschmidt, Matthias, Usability Issues of Sending Text Messages, The Kluwer International Series on Computer Supported Cooperative Work, vol. 4, No. 5, pp. 223-236, (2005).*

Dunlop, M.D. & Crossan, A. Predictive text entry methods for mobile phones. Personal Technologies 4, 134-143 (2000).*

Pereira et al., Beyond word N-grams. In David Yarovsky and Kenneth Church, editors, Proceedings of the Third Workshop on Very Large Corpora, pp. 95-106, Somerset, New Jersey, 1995.

Berard C., Neimeijer D. Evaluating effort reduction through different word prediction systems. Proceedings of the IEEE International Conference on Systems, Man and Cybernetics, La Haye NL. vol. 3, pp. 2658-2663. Oct. 2004.

Assadollahi, R., Pulvermuller, F., 2003. Early influences of word length and frequency: a group study using MEG. NeuroReport 14,1183-1187.

Jones, P. E., Virtual keyboard with scanning and augmented by prediction, Proc 2nd European Conference on Disability, Virtual Reality and Associated Technologies, (University of Reading, UK, 1998),45-51.

Hollis Weber, "Taming Microsoft Word 2002", 122 Pages, published on Oct. 10,2002.

Potipiti, T., Sornlertlamvanich, V., & Thanadkran, K. (2001). Towards an intelligent multilingual keyboard system. Paper presented at the Human Language Technology Conference (HL T 2001), Mar. 18-21, 2001, San Diego.

B. Y.-L. Kuo et al.; "Tag Clouds for Summarizing ~~eb Search Results" W\~t~ Conference 2007, [Onl'ine] May 8-12, 2007 XP002496297 Banff, Alberta, Canada.

Berhard D.: ~Multilingual tern extraction 1,6,7 from domain-specific corpora uS'j ng morphological structure 11th Conference of the European Chapter of the Association for Computational.

iHEARST M.A , Rosner D.: RTag Clouds 1,6,7 !Data Analysis Tool or Social Signaller? ! <;+St Annual Hawaii Internationt\.L !Conference on System Science, [Online] !Jan. 7-10, 2008.

Assadollahi, R; Pulvermu,ller; 2003, Early Influences of Word Length and Frequency: A Group Study Using MEG NeuoReport 14, 1183-1187.

Sam A. Inverso, Nick Hawes, John Kelleher, Rebecca Allen and Ken Haase "Think and Spell: Context-Sensitive Predictive Text for an Ambiguous Keyboard Brain-Computer Interface Speller" Biomedzinische Technik, [online] D vol. 49, No. 1 Sep. 2004.

Tom Stocky, Alexander Faaborg, Henry Lieberman "A Commonsense Approach to Predictive Text Entry" Proceedings of Conference on Human Factors.

Office Action for U.S. Appl. No. 13/229,769 dated Jan. 24, 2012.
Office Action for U.S. Appl. No. 11/131,867 dated Apr. 2, 2008.
Office Action for U.S. Appl. No. 11/131,867 dated Jan. 16, 2009.
Office Action for U.S. Appl. No. 11/131,867 dated Aug. 19, 2009.
Office Action for U.S. Appl. No. 11/131,867 dated Dec. 2, 2010.
Notice of Allowance for U.S. Appl. No. 11/131,867 dated Jun. 29, 2011.
Office Action for U.S. Appl. No. 11/550,668 dated Dec. 29, 2008.
Office Action for U.S. Appl. No. 11/550,668 dated Apr. 29, 2009.
Office Action for U.S. Appl. No. 11/550,668 dated Apr. 22, 2010.
Notice of Allowance for U.S. Appl. No. 11/550,668 dated Aug. 16, 2010.
Office Action for U.S. Appl. No. 11/940,400 dated Oct. 4, 2010.
Office Action for U.S. Appl. No. 11/940,400 dated Jul. 12, 2011.
Notice of Allowance for U.S. Appl. No. 11/940,400 dated Nov. 2, 2011.
Office Action for U.S. Appl. No. 12/416,891 dated Jun. 23, 2011.
Office Action for U.S. Appl. No. 12/416,891 dated Nov. 22, 2011.
Search Report for EP Application No. 06 024049.6.
U.S. Appl. No. 11/470,579.
Forney, Jr., G. D., *The Viterbi Algorithm*, Proceedings of the IEEE, 1973K, pp. 268-278.
Kashyap et al., *Spelling Correction Using Probabilistic Methods*, Mar. 1984, pp. 147-154.

* cited by examiner

TEXT INPUT DEVICE AND METHOD

CLAIM FOR PRIORITY AND INCORPORATION BY REFERENCE

This application is a continuation-in-part of U.S. application Ser. No. 11/131,867 filed May 18, 2005, Ser. No. 11/560,668 filed Nov. 16, 2006, and Ser. No. 11/940,400 filed Nov. 15, 2007 the contents of each of these applications is hereby incorporated by reference. This application further claims priority from EP 07113700.4 filed Aug. 2, 2007.

FIELD OF THE INVENTION

The present invention relates to a text input device and a method for inputting text, and a computer program for performing the method. More particularly, the present invention relates to a device such as a personal digital assistant or cellular telephone which incorporates a method for entering a word based on a contextual input text prediction. The method of the present invention minimizes the number of keystrokes necessary to input text.

BACKGROUND OF THE INVENTION

The use of miniature computers such as personal digital assistants (PDA) and cellular devices capable of text messaging and text based communication has become increasingly popular. Email and SMS are examples of modem communication means which are widely used. Such miniature devices include correspondingly miniature sized input mechanisms. Typically PDA's and the like utilize a miniature keyboard or a multi-tap data entry mechanism. The miniature size of the input mechanism makes it impractical to enter large amounts of text, and it is desirable to minimize the number of keystrokes necessary to enter text. Entering a message text is in particular burdensome on small handheld devices which do not have a full standard keyboard such as mobile/cellular phones, PDAs, wireless devices, pagers, etc. In devices with only numeric keypads, every key is assigned to multiple letters and the user has to select the desired letter by pressing the corresponding digit key multiple times (multi-tap approach).

One approach to ease text input is to employ a dictionary of known words. The user presses the digit keys corresponding to the letters of the word only once (single-tap approach). Based on already entered keys, the system searches for dictionary words that match the entered key sequence and displays a matching candidate from the dictionary. The user continues until keys for all letters of the intended word have been entered. In the optimal case, the correct word is directly displayed as proposed candidate. Otherwise, the user can go through the other dictionary words matching the entered key sequence in order to search the intended word. Quite often the intended word is not listed in the dictionary and needs to be entered separately, e.g., using the multi-tap approach.

When selecting the intended word from matching dictionary words, the candidates are usually presented individually and sequentially in the form of a linear list. Thus, many cursor key strokes may be necessary to scroll down the list starting from the system proposed candidate to reach and select the intended word. This makes entering text still a laborious task for users of handheld devices.

When the input method comprises a word prediction component that predicts words depending on the context of the text written so far, there is also a problem of efficiency. A prediction algorithm will always predict multiple candidate words for a given context, usually these candidate words will be ranked by some score indicating their appropriateness for the present context. If these words are given in a candidate list, the user has to scroll down the list in order to highlight the word and click OK to select it. If the word is on the third spot on the list, the user has to click three times (2× down, 1× OK), if it is on the fourth spot, he/she has to click four times, and so on. Thus the value (in terms of usability and efficiency/number of clicks) of a good prediction algorithm is strongly diminished by the procedure for selecting the word. Note that English words are usually 3.9 letters long (German: 4.5), i.e. it is not very efficient to display predictions in a drop down list when it may take four clicks to select the word and it would also take four clicks to enter the word using a single tap algorithm. Thus, next word prediction would enhance efficiency only when there is an efficient method to select the predictions.

SUMMARY OF THE INVENTION

The present invention relates to a text input method comprising the steps of: predicting candidate words for text input in accordance with a text context; displaying a first set of predicted candidate words in a spatial arrangement which reflects the selectable directions of a navigational input device; receiving user input in response to the actuation of the navigational input device; and selecting a displayed candidate word based on the received user input. The candidate word is selected directly upon the selection of a direction that is selectable with the navigational input device. Thus, only one click to select the intended candidate word is necessary. Furthermore, the correlation of the spatial arrangement of candidate words and selectable directions facilitates the coordination of the user input by providing an intuitive user interface.

The present invention makes use of text prediction to determine a set of candidate words which likely succeed the present text context. The user only has to select the intended word from the presented candidates to input text. The invention works with any text prediction algorithm such as a statistical word bigram or trigram, or a grammatical text prediction. The candidate word prediction may include the calculation of likelihoods (scores) for dictionary words following the current text context as precursor.

As is apparent, the proposed approach is more successful the more precise the text prediction. Optimally the correct word is in the top-m predicted words displayed in the first set of candidates. In this case, the user can enter a single word with only one keystroke for selecting the desired word. If the intended word is not displayed among the top-m candidates, a second set of candidate words having a smaller prediction score for the current text context may be presented to the user, e.g. upon the actuation of a dedicated key.

The prediction of candidate words can be improved by prompting the user to enter characters associated with the intended word. For instance, by entering the initial n characters of the intended word, the prediction may be focused on candidates that match these initial characters. Thus, user input from input keys that are assigned to alphabetic characters may be received and the prediction of candidate words updated based on the received user input by limiting the candidate words to candidate words including the alphabetic characters associated with the actuated input keys. In general, it is not necessary that the user input is unambiguously assigned to the characters. In most applications, assignments of keys to multiple characters (like in telephone keypads) are sufficient for efficiently restricting the prediction to relevant candidates.

In case that the navigational input device comprises direction or cursor keys for inputting direction commands, the candidate word may be selected when a corresponding direction key of the navigational input device is pressed.

The method may use any number of directions that can be selected with the navigational input device. For instance, the 4 directions (up, down, left, right) assigned to the cursor keys of a keyboard or keypad may be assigned to the displayed candidates. In this case, the candidates are preferably arranged in a cross-shape. Alternatively, 8 direction key including 4 diagonal directions may be assigned to correspondingly arranged candidates.

The method may comprise the step of mapping the currently displayed candidate words to the selectable directions of the navigational input device. As the displayed candidate words may change depending on user input and the text context, which may include previously entered words and/or punctuation marks, the assignment of candidates to selectable directions is dynamic and may be updated upon user input to specify and select candidates.

Preferably, the text context is updated based on the selected candidate word by adding the selected word to the context string. Then, updated candidate words may be determined based on the updated text context by applying the text prediction algorithm to the updated context. Next, the updated candidate words are displayed and the user is prompted to select another word. Thus, a complete text may be entered by repeating this sequence.

According to a preferred embodiment, the candidate words are arranged in the spatial arrangement in accordance with their respective prediction relevance for the current text context. This allows arranging strong candidates with a high prediction score in a preferred position for further easing their selection. For instance, the candidate word with the largest likelihood of succeeding the current text context may be arranged for display in a preferred position which corresponds to an 'OK' or 'Enter' key of the navigational input device.

Preferably, the previously selected candidate words are displayed as word string to represent the already inputted text on a display device. Typically, a cursor is arranged at the end of the word string. By arranging the currently displayed candidate words in the horizontal direction in accordance with the last displayed candidate word of the word string, the presentation of the candidates on the display device "grows" with the inputted text. As the candidates are presented in alignment with the cursor at the end of the word string, the user's eyes need not move much on the display device to capture the relevant parts of the user interface.

According to a preferred embodiment, the spatial arrangement of the displayed candidate words is adjusted according to the length of the candidate words so that all candidate words fit on a display screen. This is particularly useful if long candidates with many characters are displayed on a small display device. In order to avoid a horizontal overlap of displayed candidate words, which may occur when all candidates are aligned on one line of the display, the display position of one or more candidates may be shifted vertically on the display device. For instance, a candidate word may be shifted up out of the normally applied cross-shaped spatial arrangement.

The invention further relates to a text input device comprising a text prediction component for predicting candidate words in accordance with a current text context; a display screen for displaying the predicted candidate words; a data entry device having a navigation means for selecting a direction to move a cursor on the display screen; and a processor receiving data from the data entry device upon actuation of the navigation means. The processor may arrange the candidate words on the display screen in a spatial arrangement that reflects the selectable directions of the navigation means. The processor may map dynamically the currently displayed candidate words to the corresponding selectable directions of the navigation means. The processor may select a candidate word directly upon selection of a direction, preferably when a direction key of the navigation means is actuated. Thus, only one click is necessary for the selection of the correct candidate.

According to a preferred embodiment, the navigation means comprises direction keys (cursor keys) for indicating a direction to control cursor movement. Alternatively, the navigation means may comprise a rocker or joystick for indicating a direction to control cursor movement. The data entry device may comprise a telephone type keypad having digit keys which are assigned to multiple alphabetic characters.

The text input device of the invention may comprise a word dictionary for storing possible candidate words. Then, the prediction component may calculate prediction scores for the candidate words of the word dictionary to succeed the present text context.

An embodiment of the present invention relates to a handheld electronic device comprising a text input device and a communications section to send and receive text messages. Preferably, the communications section is configured to send and receive the text messages via a wireless network. Thus, a mobile device for improved handling of SMS and/or email is provided which allows the user easier text input for authoring text messages even without a full keyboard having separate keys for all alphabetic characters.

The present invention may be implemented as a computer program product comprising computer readable instructions stored on a medium for causing a computer to perform the above method when executed on the computer. The medium may be any known medium capable of storing computer instructions.

DETAILED DESCRIPTION OF THE PREFERRED EMBODIMENTS

The present invention provides an efficient method for inputting text, and is particularly suited for cellular telephones, handheld computers such as personal digital assistants, and other devices requiring data entry.

The basic concept underlying the present invention is to map dynamically displayed candidates for succeeding words of the present text context to selectable cursor directions. The user can then choose one candidate by selecting a direction, e.g., by actuating a cursor key. This allows for a selection from a set of displayed candidates with one key click as compared to the presentation of candidates in the form of a list which needs multiple clicks on average to scroll though the list and activate the desired candidate. The advantage of the present invention is achieved by arranging the candidates on the display in a spatial representation which corresponds to the arrangement of the keys used for selection. Thus, the user can easily comprehend the relation of the instantaneously displayed candidates to the selection keys. The selection keys are preferably keys having a particular arrangement on the keypad of the device such as cursor keys which are assigned to the special selection function when the device is in the predictive text input mode.

Figure 1:
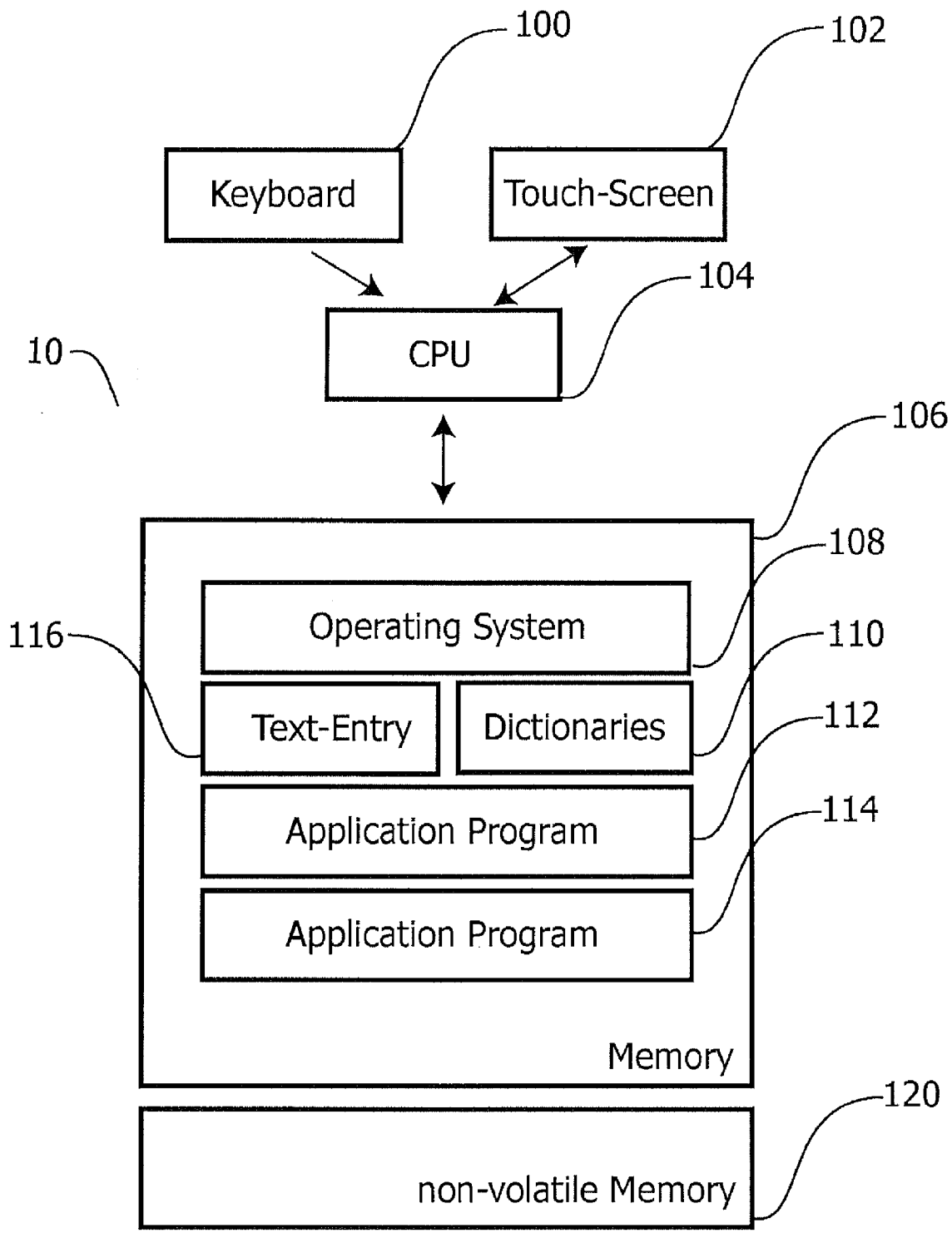
FIG. 1 is a block diagram of a device including the predictive data entry mechanism of the present invention.

FIG. 1 is a block diagram of the operating environment of the present invention.

The system 10 of the present invention includes an input device 100 which may be a keypad, rocker, joystick or the like which hereinafter will be referred to as input device 100. The system 10 further includes a display 102 for displaying the text entered as well as an m-word arrangement of predicted words. The screen may be an LCD screen or the like.

As further illustrated in FIG. 1, the system 10 includes a processor or central processing unit (CPU) 104 which executes commands via an operating system 108. The system 10 may include a plurality of application programs 112, e.g. an application for inputting text 116, an application which displays text 114 and one or more dictionaries 110.

It should be appreciated that the text input application 116, the display application 114, and one or more of the dictionaries 110 may be implemented as firmware or microcode stored on a non-volatile memory 120 such as an EPROM, EEPROM or the like. Use of the term "software" throughout this disclosure should be interpreted to include software implemented through firmware and stored on a non-volatile memory medium.

The present system is realized as software or firmware or the like, architecturally located between the operating system 108 of the computer 104 and an application 112 that receives text as input, e.g. a word processor, an SMS editor, or an email editor for rendering text messages.

The system 10 may be language specific and have one or more dictionaries or vocabulary modules. The dictionary 110 and keyboard 100 may be language specific. However, the software may allow for switching dictionaries and thus switching languages.

One aspect of the invention relates to its ability to predict the next word the user will input based on the preceding words or delimiters which will hereinafter be referred to as the context or precursor. It is notable, that the context may also arise from the type of application receiving the text or the type of text field receiving the text. In the first case, the application may give a hint to what kind of style the user will use (SMS, short message service: colloquial writing vs. word processor: formal writing). In the second case, some operating systems assign unique identifiers to certain text fields such as "name", "address", etc. This information may be used to activate a different dictionary containing all names, addresses, cities etc.

The system 10 predicts the next word the user will enter based on the context, and displays a list of candidate words. The number of candidate words displayed is dependent upon the size and resolution of the display (the screen's real estate), the font size in which the text is displayed, and the spatial representation of the candidate words on the display. Moreover, the system 10 may optionally be configured to only display candidate words whose score exceeds a threshold value, further limiting the number of candidate words displayed.

One aspect of the invention is that the list of candidate words is context dependent. The system 10 selects candidate words by looking at the immediately preceding word or words which will be termed a precursor. The number of words defining a precursor may vary. It should be understood that the term "word" as used throughout the specification refers to a conventional word of text and to a delimiter such as a space, a period, a comma, a semi-colon and the like.

As will be described below in further detail, the system may iteratively reduce the size (measured in words) of the precursor in order to obtain a desired number of candidate words. For example, a three word precursor may have two corresponding candidate words. If the display and/or the arrangement of the candidates has/have room for more words, the system may obtain additional candidate words by reducing the size of the precursor. A two word precursor may for example have four corresponding candidate words, and a one word precursor may have ten corresponding candidate words.

The system 10 includes at least one dictionary 110 including a list of candidate word entries; each candidate word entry includes an index and a candidate word. It should be understood that a given precursor may have many candidates. Thus, the same index may appear in multiple candidate word entries in the dictionary. For example the precursor "the" is likely to have many candidates. Each candidate word entry further includes a score indicative of the frequency of occurrence.

As will be explained below, the dictionary stores a plurality of candidate word entries. Each candidate word entry includes an index, a candidate word, and a score. The size (measured in words) of the index may vary from entry to entry. Thus the dictionary may store candidate word entries having a one word index, and entries having a two word index, and entries having a three word index, etc. In this manner, the system may use a one word precursor or a two word precursor etc.

The text prediction aspect of the present invention will now be explained with reference to a bi-gram or two word embodiment in which the precursor is the immediately preceding word (or delimiter). In a tri-gram embodiment the precursor consists of the two immediately preceding words (or word/delimiter combination). Similarly, a four-gram embodiment the precursor consists of the three immediately preceding words. It should be understood that the teachings of the present invention may be implemented using any number of words in the precursor. The size of the index stored in the dictionary must correspond to the size of the precursor.

According to the bi-gram embodiment each candidate word entry in the dictionary 110 includes a list of two-word phrases in which the first word is termed the index and the second word is termed the "candidate" word. The precursor is the key or index used to access the "candidate" word(s). It should be appreciated that a single precursor may have multiple candidate words.

As noted above, each entry in dictionary 110 includes a score indicative of the frequency of occurrence, i.e., the frequency in which the user uses the phrase. A given precursor may have multiple candidate words, and the score associated with each candidate word may or may not be the same.

Each time the user enters (or selects) a precursor, the system 10 searches the dictionary 110 for corresponding candidate words. The system 10 ranks the candidate words according to their score, and displays the first m-number of candidate words in field 204.

The system 10 may treat the initial state before any word has been entered in the same way it reacts when the precursor is a delimiter such as a period. In this manner the system 10 may be configured to provide candidate words in the initial state before the user has entered a first character of the text.

The system 10 may be self-training in the sense that new phrases and their corresponding scores may be dynamically added to the dictionary 110. Moreover, the score of existing phrases may dynamically update to reflect changes in the frequency of usage.

According to a preferred embodiment, the system 10 is provided with a robust dictionary 110 such that the full benefit of the system is immediately available to the user. Moreover, if the system 10 permits the score of existing phrases to dynamically update then the dictionary 110 will self-optimize to reflect the style, diction, and vocabulary of the user. Thus, even if the dictionary 110 is initially empty, the system 10 will compile its own dictionary reflective of the user's vocabulary, diction and style.

An initial dictionary 110 may be compiled by examining a body of text for x-word phrases, and ranking the frequency of the x-word phrases. In the bi-gram embodiment of the present example x will equal to 2. Ideally the body of text used to compile the dictionary will contain a rich vocabulary and varied examples of style and diction.

The system 10 is especially useful for languages for which it is complex to input words, e.g. Chinese. The system 10 may thus operate on full symbols or on morphemes (one or more morphemes make up a word of a language) or even on syllables (e.g. Hiragana or Katakana in Japanese).

In the preceding example, the precursor was the immediately preceding word (or delimiter). However, one of ordinary skill in the art will appreciate that the invention may be readily adapted to select one or more candidate words using any size of precursor, e.g. a two or three word precursor.

In the aforementioned example, the candidate words were generated using the score associated with each dictionary entry, where the score is indicative of the frequency and is statistically generated. However, the candidate list can also be generated using grammatical rules. For example, if the system 10 has identified a context in which only a verb can follow, all nouns will be excluded from the candidate list.

As noted above, the system may provide one or more candidate words in the initial state before the user has provided a precursor. According to a further refinement of the present embodiment, the system may refresh or update the candidate list in response to character(s) entered by the user. More particularly, the system responds to the user's entry of the first letter of the desired word by displaying only those candidate words whose initial letter corresponds to the entered letter. In this case the candidate words are selected in accordance with the precursor and the characters entered by the user.

The present invention is particular useful for telephone type keypads commonly applied in mobile phones, wireless communication devices, PDAs (personal digital assistance) or other portable and/or handheld devices. For these keypads (sometimes referred to as 'touch tone' or DTMF keypads), the digit keys are assigned with a plurality of letters each. For instance, the digit '2' has assigned the letters 'A', 'B', 'C' of the alphabet. The user presses the '2'-key to input that he/she wants to select either 'A', 'B' or 'C' (or 'a', 'b', 'c' if the system differentiates between lowercase and uppercase letters). The present invention will then restrict the selected candidates to words that match either of the letters associated with the pressed key. These constraints for the candidates are not that strong as if only one letter would be selected, but due to the text prediction capabilities based on the word context as applied by the invention, in most instances, it is still possible to narrow down the candidate list to only a few displayed candidates which allows the user to easily select the intended word. In most cases, the number of available candidates will go down rapidly to small number of candidates with only a few keystrokes, even if the pressed keys are not unambiguously assigned to individual letters. The user then only has to select the correct candidate from among the remaining candidates.

One aspect of the invention relates to the selection of an intended word from the predicted candidates that are displayed on the screen of a handheld device. More particularly, it concerns the presentation of predicted words in a text entry situation on a standard 12 digit mobile phone. According to the invention, the user can select from predicted words using just one click as the top five predicted words are directly mapped to keys of the mobile device such as the direction keys of a rocker or D-pad on a mobile phone.

FIGS. 2 to 5 illustrate the operation of an embodiment of the invention. The drawings show a handheld device 200 comprising a display section 210 and an input section 220. The display section 210 includes a window 230 for display of candidate words. The input section includes a selection key section 240 with cursor/direction keys and a central 'OK' button having a function similar to the 'enter' button on a standard keyboard. Further, a digit keypad 250 is provided.

The invention departs from the standard logic of using the rocker or cursor keys. On standard systems usually some kind of cursor is linked to the rocker direction keys, and the cursor is moved through some menu structure when the rocker is actuated. The intended menu item, e.g. a candidate word, is then selected by using an 'OK' button, e.g. the central rocker key. This leads to at least two clicks in most of the situations: the user has to move the cursor to the intended item and then select it. Only when the cursor is initially highlighting the intended menu item in its default position, a single click selection is possible.

Figure 2:
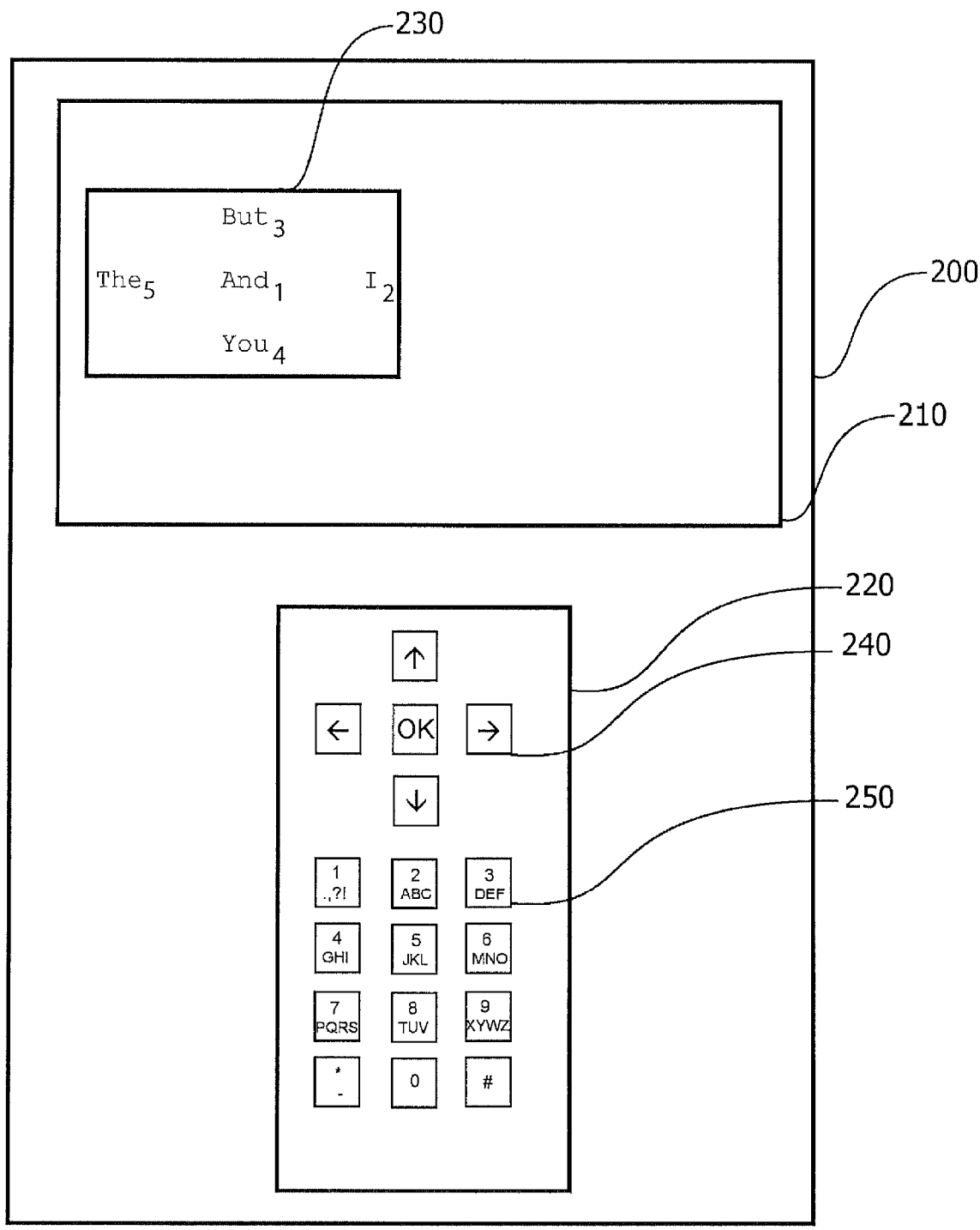
FIGS. 2 to 5 illustrate the operation of an embodiment of the present invention.

The present invention breaks the conventional menu navigation in that the cursor and its movement are eliminated and the rocker is used as a configuration of five keys who immediately select a function, e.g. activating a displayed candidate word as text input. This allows for a new form of user interaction. While in conventional systems the rocker is used for navigating through text, the present invention maps the top 5 word predictions (henceforth called candidates) to the five direction keys of the rocker as shown in FIG. 2. Thus, the user can select one of the five candidates by just one click. This approach is particular useful when the candidates are generated by a text prediction algorithm. In this case it is even possible to predict the user's next word before he/she has entered anything.

Analyses of prediction quality have revealed that in 47% the word the user wants to enter is among the top five candidates. This means that, according to the present invention, 47% of the text can be entered by just one click per word.

The numbers in the window 230 shown FIG. 2 indicate the rank of the displayed candidate words in the prediction. In order to statistically minimize the number of necessary clicks, the best prediction is arranged in position 1 and can be selected by clicking the 'OK'-key. The second best prediction is given on the right hand side (position 2) and can be selected by clicking the 'right'-key, and so forth.

Note that according to the invention the user doesn't have to select the intended word first and then confirm it by clicking 'OK' (which would translate to two clicks) but can immediately select it with just one click.

Immediately after the user has selected a word (a blank is added automatically), the candidates for the next word are re-estimated based on the updated context, displayed (cf FIG. 3), and the user can select the next word. Note that the user can leave his/her thumb on the joystick or the cursor keys and doesn't need to move his eyes between the keypad and the display. As the correct words are about in 50% of the cases within the predicted top-5 candidates, the travel for the user's eyes and thus the cognitive load due to task switching (looking at the keypad vs. looking at the display, i.e. coordinating finger movements vs. reviewing the entered text) is greatly reduced. Usability studies have shown that users can operate rockers without looking at them while most users need to look at the keypad when they enter digits. Thus it is desirable to reduce the number of incidents where the user has to enter a digit. With the present invention 47% of the letters entered are generated by selecting the candidate words and thus by not using the eyes. This is a huge improvement in terms of convenience which is also reported by users in usability tests.

Figure 3:
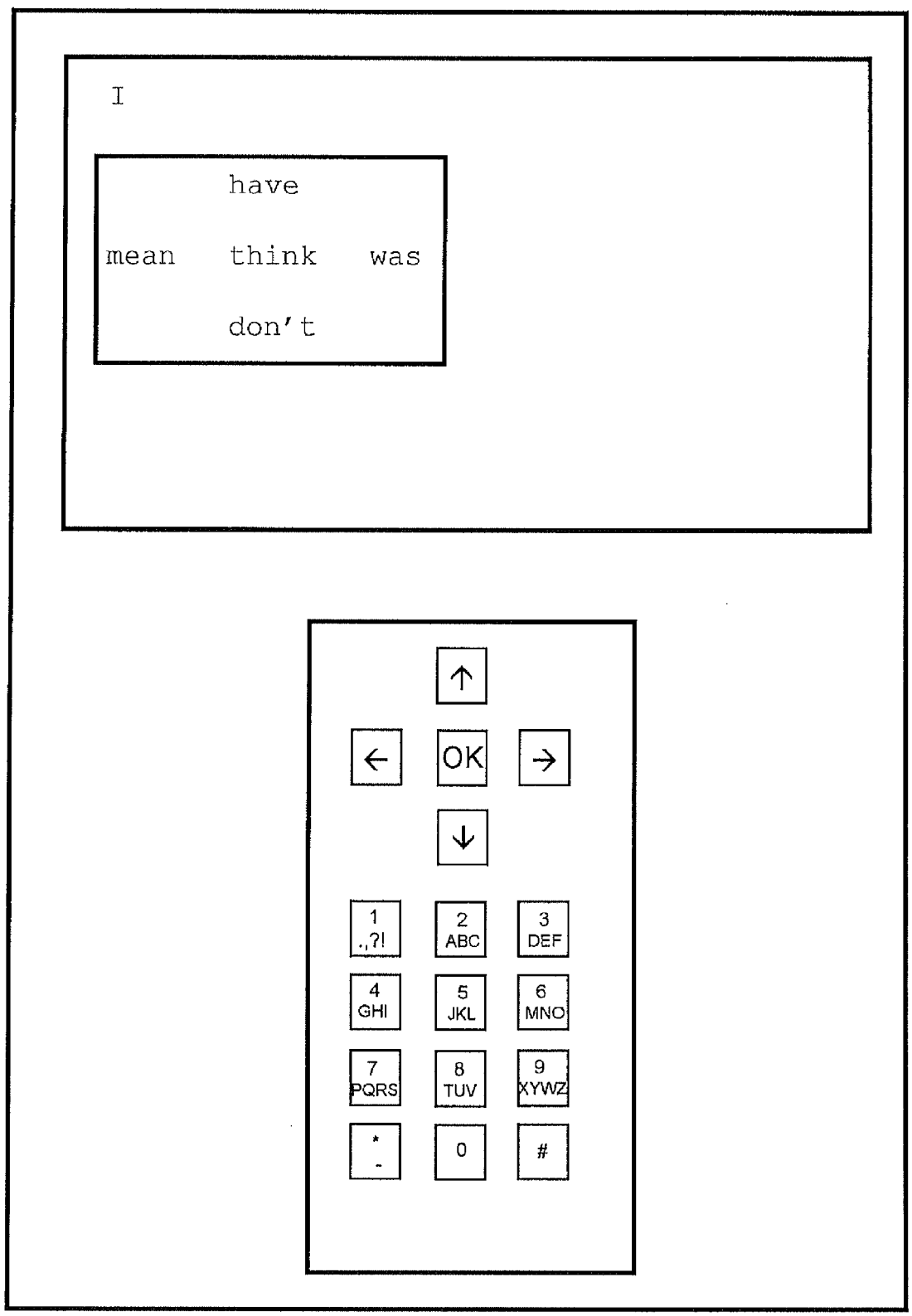
Figure 4:
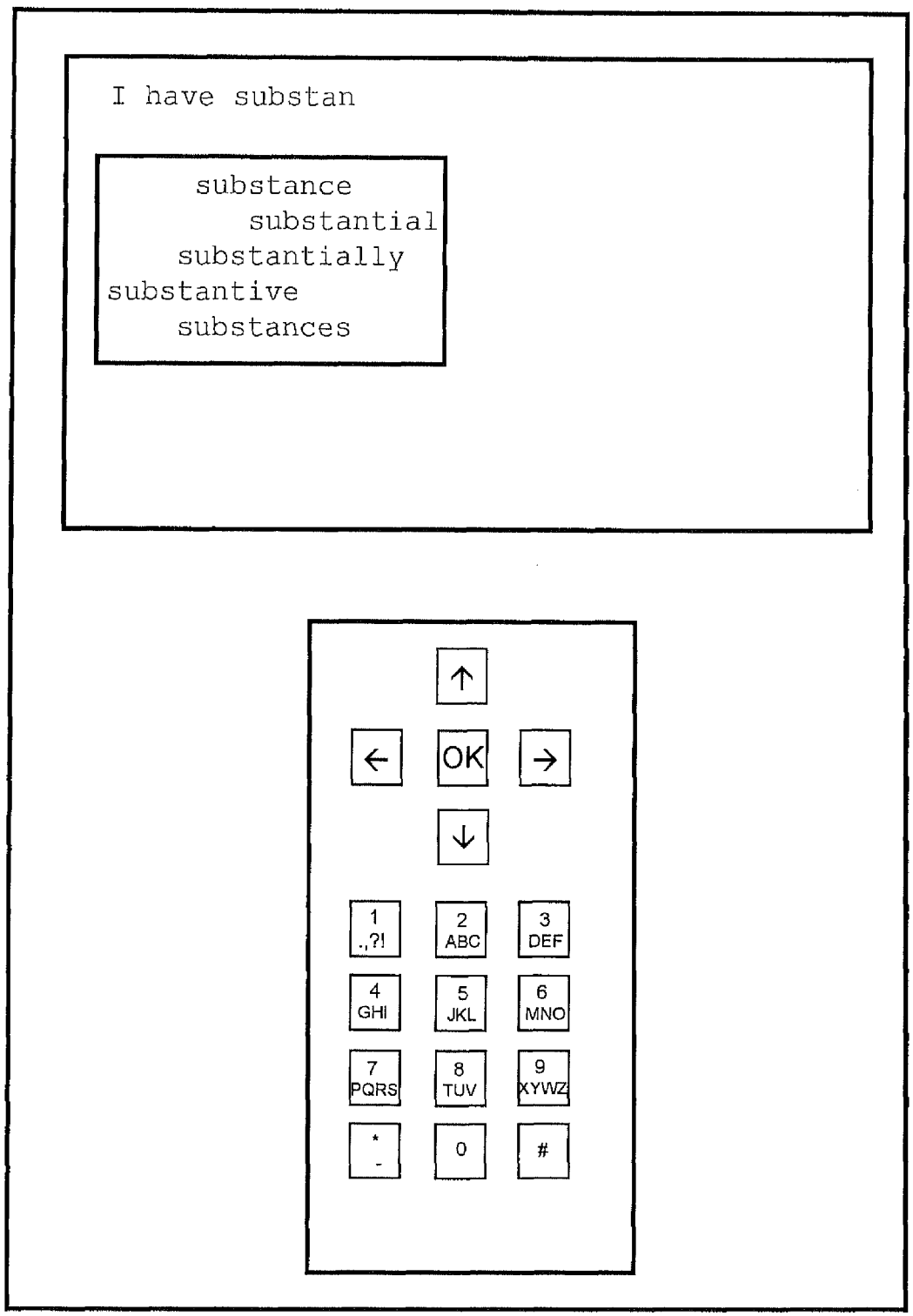
Figure 5:
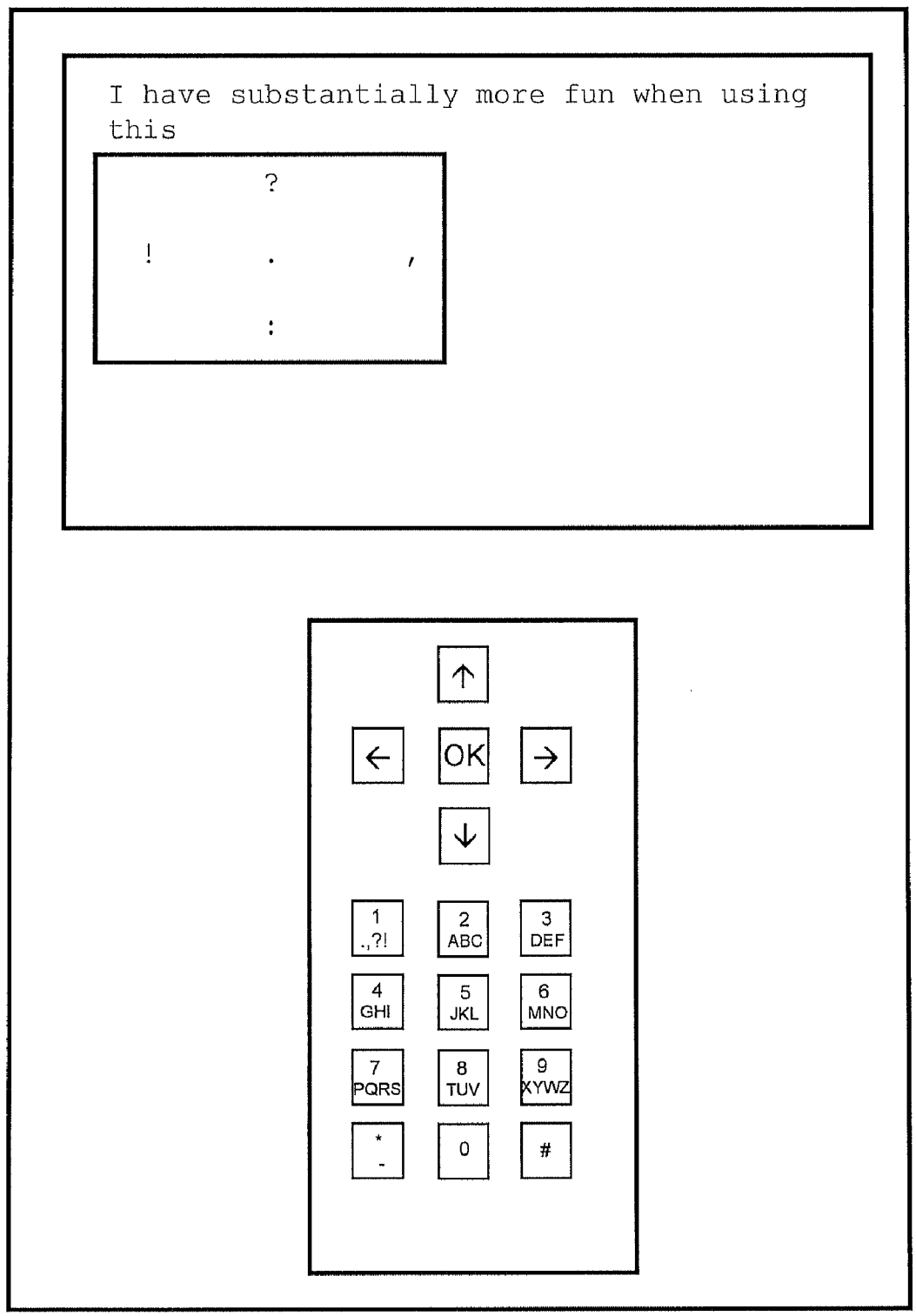

According to a preferred embodiment, the window 230 with the candidates is moving along with the cursor when more text is input. FIGS. 3 to 5 shows how the accepted text is displayed as word string in the top line of the display area 210. The arrangement of candidate words is therefore dynamically adjusted in the horizontal to the progress of text input so that the candidates are displayed in alignment with the cursor. This arrangement helps the user to focus on the display and reduces eye movements.

In case the intended word is not among the candidates displayed, the user can tap one of the digit keys 250. This will constrain the candidates to those that start with one of the letters corresponding to the digit just pressed: For example, a click on the 7-key reduces the candidate list to words starting with "p", "q", "r" or "s".

The words in the prediction window 230 may be automatically rearranged when they are too long (see FIG. 4). For instance, the candidate assigned to the left-key moves to a lower line between the OK-candidate and the down-candidate, whereas the right candidate moves up to between the OK-candidate and the up-candidate.

If the user has typed all letters of the intended word and it is still not among the top-5 candidates, there are typically two possibilities: the word is unknown (as for new names) or the word is ranking too low. In the latter case, it is preferred to browse through the candidates for displaying further candidates with lower prediction scores. According to an embodiment of the invention, a dedicated key is assigned for initiating this task. The key may be one of the regular keys of the keypad which is assigned to the candidate browse function depending on the text input state, i.e. when candidates are displayed an actuation of the dedicated key is interpreted as "show the next five candidates". Similarly, a second key may be assigned to a "show the previous five candidates"-function. For instance, by clicking on the '*'-key on the keyboard, the user can flip through the five next candidates. In addition, by clicking the '#'-key the user changes the system to teach mode where the user can enter new words into the dictionary.

Similarly, for entering punctuation marks, the user may click the '1'-key and the top-5 punctuation mark used in the present context are displayed. Like all suggestions, the list is dynamic and may adapt to the user's communication habits.

Deleting letters or words can be accomplished by clicking the delete-key that is often provided on mobile phones. A short click would delete a letter; a long (or double) click would delete the whole word.

When the user wants to navigate through the text, he/she has to change to navigation mode which may be accomplished by clicking the '0'-digit. This will lead to a different function of the rocker as the directional keys will then lead to the movement of a cursor within the text. The user would use this mode to navigate to a different position in the text and insert or delete a word or letter. Texting mode may be activated by clicking the '0'-key again.

Of course, these functions can be incorporated in different ways (e.g. by including the softkeys in the texting user interface), depending on the customer's need.

The present invention may be implemented as a computer program product comprising computer readable instructions stored on any medium suitable for storing computer readable instructions for causing a computer to perform the above method when executed on the computer.

Although the invention has been described by way of specific examples, it is not limited to those examples and many variations may be applied to the text prediction and user interface design. Accordingly, variations in and modifications to the method, system and its use will be apparent to those of ordinary skill in the art, and the following claims are intended to cover all such modifications and equivalents.

The invention claimed is:

1. A text input method, comprising:
predicting candidate words for text input in accordance with a text context;
causing a first set of predicted candidate words to be displayed in a spatial arrangement which reflects the selectable directions of a navigational input device, the first set of predicted candidate words comprising at least four candidate words arranged in four different directions reflecting respective selectable directions of the navigational input device, the navigational input device being one of a rocker, a D-Pad or cursor keys;
receiving user input in response to actuation, of the navigational input device; and
directly selecting a displayed candidate word by toggling the navigational input device in one of the four different directions reflecting the respective selectable directions of the navigational input device.

2. The method of claim 1, wherein the candidate word is selected when a corresponding direction key of the navigational input device is pressed.

3. The method of claim 1, comprising:
mapping the currently displayed candidate words to the selectable directions of the navigational input device.

4. The method of claim 1, wherein the text context includes previously entered words and/or punctuation marks.

5. The method of claim 1, comprising:
updating the text context based on the selected candidate word;
determining updated candidate words for the updated text context; and
displaying the updated candidate words in the four different directions which reflect the respective selectable directions of the navigational input device.

6. The method of claim 1, wherein the candidate words are arranged in the spatial arrangement in accordance with their respective prediction relevance for the current text context.

7. The method according to claim 6, wherein the candidate word with the largest likelihood of succeeding the current text context is arranged for display in a preferred position which corresponds to an 'OK' or 'Enter' key of the navigational input device.

8. The method of claim 1, comprising:
displaying the previously selected candidate words as word string; and
arranging the currently displayed candidate words in the horizontal direction in accordance with the last displayed candidate word of the word string.

9. The method of claim 1, comprising:
adjusting the spatial arrangement of the displayed candidate words according to the length of the candidate words so that all candidate words fit on a display screen.

10. The method according to claim 9, wherein adjusting the spatial arrangement includes a vertical shifting of at least one displayed candidate word so as to avoid horizontal overlap of displayed candidate words.

11. The method of claim 1, further comprising:
displaying a second set of candidate words having a smaller prediction score for the current text context.

12. The method of claim 1, wherein the candidate word prediction includes the calculation of likelihoods for dictionary words following the current text context as precursor.

13. The method of claim 1, further comprising:
receiving user input from input keys that are assigned to alphabetic characters;
updating the prediction of candidate words based on the received user input by limiting the candidate words to candidate words including the alphabetic characters associated with the actuated input keys.

14. A text input system, comprising:
a text prediction component for predicting candidate words in accordance with a current text context;
a display screen for displaying the predicted candidate words;
a data entry device having a navigational input device for selecting a direction to move a cursor on the display screen, the navigational input device being one of a rocker, a D-Pad or cursor keys mounted on an input section of the text input device; and
a processor receiving data from the data entry device upon actuation of the navigational input device;
wherein the processor arranges at least four candidate words on the display screen in four different directions that reflects respective selectable directions of the navigational input device, and the processor selects one of the at least four candidate words upon displacement of the navigational input device in one of the four different directions.

15. The device according to claim 14, wherein the candidate word is selected directly when a corresponding direction key of the navigational input device is actuated.

16. The device according to claim 14, wherein the arrangement of the at least four candidate words is cross-shaped.

17. The device according to claim 14, wherein the navigational input device comprises direction keys for indicating a direction to control cursor movement.

18. The device according to claim 14, wherein the data entry device comprises a telephone type keypad.

19. The device according to claim 14, comprising a word dictionary for storing possible candidate words, wherein the prediction component calculates prediction scores for the candidate words to succeed the present text context.

20. The device according to claim 14, further comprising a communications section to send and receive text messages, wherein the communications section is configured to send and receive the text messages via a wireless network.

21. A non-transitory computer program stored on a computer-readable medium for causing a processor to perform the method according to claim 1 when the computer program is executed by the processor.

* * * * *

UNITED STATES PATENT AND TRADEMARK OFFICE
CERTIFICATE OF CORRECTION

PATENT NO.           : 8,374,846 B2
APPLICATION NO.      : 12/181273
DATED                : February 12, 2013
INVENTOR(S)          : Assadollahi Page 1 of 1

It is certified that error appears in the above-identified patent and that said Letters Patent is hereby corrected as shown below:

On the Title page,
Item [75]: Delete "Constance (DE)" it should read --Konstanz (DE)--.

Signed and Sealed this
Third Day of September, 2013

Teresa Stanek Rea
*Acting Director of the United States Patent and Trademark Office*